United States Patent
Zhang et al.

(10) Patent No.: US 10,200,474 B2
(45) Date of Patent: Feb. 5, 2019

(54) CROSS-PROTOCOL DISTRIBUTED CLOUD STORAGE SYSTEM AND DATA MANAGEMENT METHOD BASED ON OPERATION CONTROL UNIT

(71) Applicant: CHONGQING GKTSINGCHIP INDUSTRY TECHNOLOGY CO., LTD., Chongqing (CN)

(72) Inventors: Sheng Zhang, Guangdong (CN); Ying Wu, Guangdong (CN); Yantong Wang, Guangdong (CN); Mansuo Zhou, Guangdong (CN)

(73) Assignee: CHONGQING GKTSINGCHIP INDUSTRY TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/468,607

(22) Filed: Mar. 24, 2017

(65) Prior Publication Data
US 2017/0201582 A1    Jul. 13, 2017

Related U.S. Application Data

(63) Continuation of application No. PCT/CN2016/071199, filed on Jan. 18, 2016.

(30) Foreign Application Priority Data

Jun. 15, 2015 (CN) .......................... 2015 1 0335779

(51) Int. Cl.
*G06F 15/173* (2006.01)
*H04L 29/08* (2006.01)
(Continued)

(52) U.S. Cl.
CPC ........ *H04L 67/1097* (2013.01); *G06F 9/4843* (2013.01); *G06F 9/5027* (2013.01);
(Continued)

(58) Field of Classification Search
CPC ..... H04L 67/1097; H04L 67/26; H04L 67/06; H04L 47/70; G06F 17/30094
(Continued)

(56) References Cited

U.S. PATENT DOCUMENTS 7,921,211 B2 * 4/2011 Larson ............. H04L 29/12066
                                                           709/226
9,053,167 B1 * 6/2015 Swift ............... G06F 17/30575
(Continued)

FOREIGN PATENT DOCUMENTS

CN         102263825 A      11/2011
CN         102368737 A       3/2012
(Continued)

OTHER PUBLICATIONS

State Intellectual Property Office of the P.R. china (ISR/CN), "International Search Report for PCT/US2016/071199", China, dated Apr. 20, 2016.

*Primary Examiner* — Michael Won
(74) *Attorney, Agent, or Firm* — Locke Lord LLP; Tim Tingkang Xia, Esq.

(57) ABSTRACT

The present invention discloses a cross-protocol distributed cloud storage system based on a network node operation control unit. The distributed cloud storage system includes a plurality of network nodes, each of which includes an operation control unit that directly interacts with a data link layer, the operation control unit including a file unit, a network information management unit and a resource scheduling unit, wherein the file unit is used to mange and store file information of the network node where it is located; the network information management unit is used to interact with the data link layer so as to perform link scheduling for delivering the information between the network nodes, and to update data between the nodes; the resource scheduling unit is used to allocate and schedule hardware or network
(Continued)

resources for the network information management unit and the file unit for implementing functions thereof.

8 Claims, 6 Drawing Sheets

(51) Int. Cl.
  *G06F 9/48* (2006.01)
  *G06F 9/50* (2006.01)
  *H04L 12/911* (2013.01)
  *H04L 29/06* (2006.01)
  *H04W 12/00* (2009.01)
  *H04W 4/70* (2018.01)
  *G06F 17/30* (2006.01)
  *H04W 84/18* (2009.01)

(52) U.S. Cl.
  CPC .............. *H04L 47/70* (2013.01); *H04L 63/00* (2013.01); *H04L 67/06* (2013.01); *H04L 67/10* (2013.01); *H04L 67/12* (2013.01); *H04L 67/26* (2013.01); *H04L 69/321* (2013.01); *H04L 69/322* (2013.01); *H04L 69/324* (2013.01); *H04W 12/00* (2013.01); *G06F 17/30094* (2013.01); *H04W 4/70* (2018.02); *H04W 84/18* (2013.01)

(58) Field of Classification Search
  USPC .................................. 709/201, 223, 226, 248
  See application file for complete search history.

(56) References Cited

U.S. PATENT DOCUMENTS

| | | | |
|---|---|---|---|
| 2007/0109975 A1* | 5/2007 | Reckamp | H04L 12/2803 370/254 |
| 2009/0193193 A1* | 7/2009 | Kern | G06F 11/1441 711/128 |
| 2011/0161973 A1* | 6/2011 | Klots | G06F 17/30566 718/104 |
| 2012/0260019 A1* | 10/2012 | Malaiyandisamy | G06F 9/5077 711/6 |
| 2014/0153392 A1* | 6/2014 | Gell | H04W 28/0236 370/230 |
| 2016/0261685 A1* | 9/2016 | Chen | H04L 67/104 |
| 2017/0031874 A1* | 2/2017 | Boudville | H04L 61/305 |
| 2018/0060106 A1* | 3/2018 | Madtha | G06F 9/45558 |
| 2018/0063021 A1* | 3/2018 | Beveridge | G06F 9/50 |

FOREIGN PATENT DOCUMENTS

| | | |
|---|---|---|
| CN | 102946429 A | 2/2013 |
| WO | 2013091365 A1 | 6/2013 |

\* cited by examiner

CROSS-PROTOCOL DISTRIBUTED CLOUD STORAGE SYSTEM AND DATA MANAGEMENT METHOD BASED ON OPERATION CONTROL UNIT

CROSS REFERENCE TO RELATED APPLICATIONS

The present application is a continuation of international application no. PCT/CN2016/071199, filed on Jan. 18, 2016, which claims priority to China Patent Application no. 2015103335779, filed on Jun. 15, 2015, both of which are hereby incorporated by reference in their entireties.

TECHNICAL FIELD

The present application for invention relates to a cross-protocol distributed cloud storage system and data management method to be applied to network nodes of the Internet of Things, and more particularly, to a cross-protocol distributed cloud storage system and data management method based on network nodes of an operation control unit.

BACKGROUND ART

Internet of Things is network for realizing information-ization, remote management control and intelligentization by linking sensors, controllers, machines, persons and things together in a new manner through communication technology such as a local network or Internet to form links between people and things and between things. With the rapid development of Internet of Things technology, more and more articles are networked. However, intercommunication can hardly be achieved due to different standards of information systems built in different regions in different stages, and the so-called "information isolated islands" are formed. The user needs a uniform platform in which a plurality of networks and a plurality of protocols are compatible to realize intercommunication.

As one way for implementing the Internet of Things, a Wireless Sensor Network (WSN) is a wireless network consisting of a large number of static or mobile sensors in a self-organizing and multi-hop manner to collaboratively sense, acquire, process and transmit information of objects sensed in a geographic region covered by the network and finally send this information to the owner of the network.

In the existing Internet of Things comprising a plurality of network nodes, the information of various network nodes adopting the same or different network communication protocols is generally stored through cloud storage technology. Cloud storage technology means integrating a large number of different types of storage devices in a network through application software by means of clustered applications, network technology or distributed file system to allow them work collaboratively and jointly provide data storage and service access functions to the outside. The current cloud storage is all implemented in the application layer, and it solves the problem of storage pressure for mass data. However, the architecture of cloud storage itself and the process of user access are complicated, and application software is required to centrally manage devices. When a user wants to acquire or is transmitting data, access needs to be performed via a user access layer, and data are to be downloaded from a uniform data storage layer provided by the service provider. Such centralized management greatly increases communication overhead, and wastes the bandwidth and power consumption of channels.

The numerous terminals in the Internet of Things are generating numerous data all the time, but not all of the data need to be stored permanently. A lot of the data will lose their value once they are used for the first time, and these data do not need to occupy the storage space for a long time. Unnecessary storage resources will be wasted if any single datum is completely stored. According to the life cycle concept, such data are defined as short life information: the information with a short process of establishment, use and lose of value. It has the following characteristics:
1) real-time strong
2) short timeliness
3) unpredictability
4) large data scale The centralized cloud-storage method for the network node information adopting the same or different network communication protocols in the existing Internet of Things causes the problem of massive data storage, and meanwhile information transmission requires occupying a lot of communication resources, and the power consumption and bandwidth required by information transmission are positively related with the transmitted information amount and distance. The method mentioned in the present patent can facilitate to solve these problems.

The disclosure of the above background art is only for assisting the understanding of the concept and technical solution of the present application for invention, and does not necessarily belong to the prior art of the present application for invention. The above background art shall not be used to evaluate the novelty and inventiveness of the present application without any explicit evidence showing that the above content has been disclosed before the filing date of the present invention application.

SUMMARY OF THE INVENTION

The purpose of the present patent is to provide a distributed cloud storage system and cloud storage method based on an operation control unit. Data management for network nodes is achieved by using a common method in the communication protocol layer. Data management includes managements of data storage and data share, and the adopted method has no directly relation with the specific communication protocol standard used in the communication protocol layer.

Compared with the prior art, the beneficial effects of the present application includes: first, direct interaction between a network information management unit and a data link layer can achieve real-time share of information between nodes, thereby improving communication efficiency; second, various nodes achieve data storage and self-management through a file unit, thus achieving a real sense of distributed cloud storage, and the nodes manage data by themselves, without centralized management of software.

SPECIFIC EMBODIMENTS

The present invention application will be further described below with reference to the drawings in conjunction with specific examples. It should be noted that the following description is only for illustration, and is not intended to limit the scope and utilization of the present invention application.

Non-restrictive and non-exclusive examples will be described with reference to the following drawings, in which the same reference signs indicate the same parts, unless specifically explained otherwise.

A person skilled in the art shall appreciate that various modification can be made to the description, and thus the examples are only used to describe one or more specific embodiments.

Figure 1:
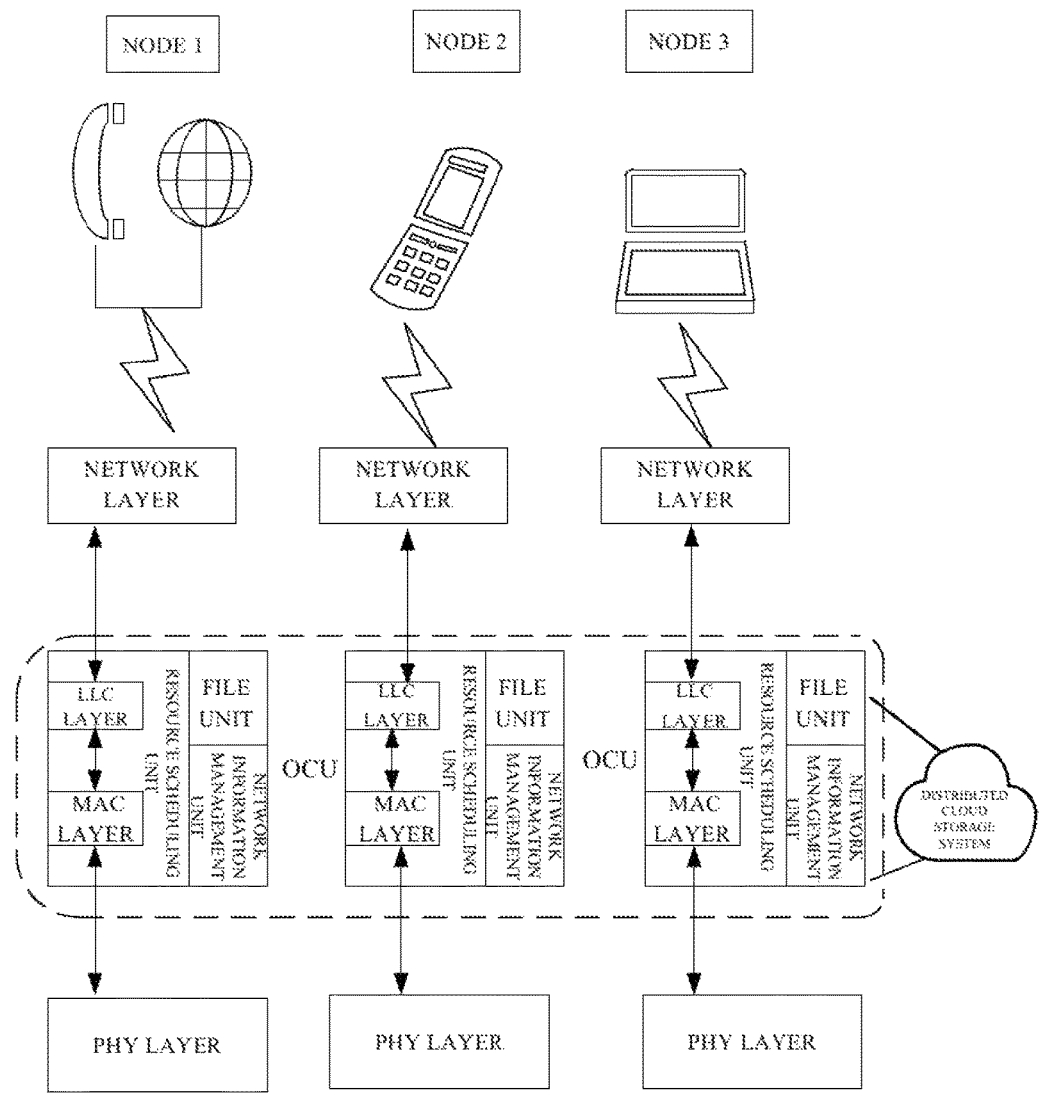
FIG. 1 illustrates the network architecture using the distributed cloud storage based on an operation control unit according to the present invention.

FIG. 1 illustrates a cross-protocol distributed cloud storage system based on a network node operation control unit according to the present invention. The distributed cloud storage system includes a plurality of network nodes, among which three nodes, namely node 1, node 2 and node 3 are exemplarily shown in FIG. 1. The node may be network terminals such as smart phone, computer, telephone, etc, or may also be various nodes in the Internet of Things. Taking the Internet of Things as an example, each node may represent one terminal in the Internet of Things. For example, in an Internet of vehicles, each node may represent a vehicle. In an Internet of Things consisting of a plurality of wearable smart devices, each node may represent one wearable smart device, such as smart watch or smart glasses.

The each network node includes an operation control unit (OCU) directly interacting with a data link layer. The OCU is implemented below the application layer, for example, it may be located in the data link layer or directly interacts with the data link layer for collaboratively work with the data link layer protocol and physical layer protocol to manage data and part of the channel resources, and it may support different data link layer protocols or physical layer protocols at the same time, thereby achieving a cross-protocol distributed cloud storage solution.

The OCU includes a file unit for storing node file information and a network information management unit for updating, managing the node file information and pushing the node file information between nodes. The OCU further includes a resource scheduling unit for allocating and scheduling hardware or network resources for the network information management unit and the file unit for implementing functions thereof.

In particular, the file unit is used to manage and store the file information of the network node where it is located, and the file unit is further used to organize and allocate file storage space, and is responsible for file storage and protecting and searching stored files. According to an example of the present invention, the data of the network node can be stored in a manner of block chain table. The block chain table will be described in detail below with reference to FIG. 4.

The network information management unit is used to perform link scheduling to transmit the information between the various network nodes and to update the data between the nodes. According to an example, the network information management unit includes a data push sub-unit which is responsible for automotive push of information between the nodes and a data update sub-unit which is responsible for update of the data between the nodes.

The resource scheduling unit is used to allocate and schedule hardware or network resources for the network information management unit and the file unit for implementing functions thereof. According to an example of the present invention, the cloud storage of the present invention may be implemented by a micro control unit (MCU) at each node, therefore, the resource scheduling unit can allocate and schedule hardware resources for the network information management unit and the file unit, for example, allocating the resources occupying CPU, bus resources, network bandwidth resources and so on.

Figure 2:
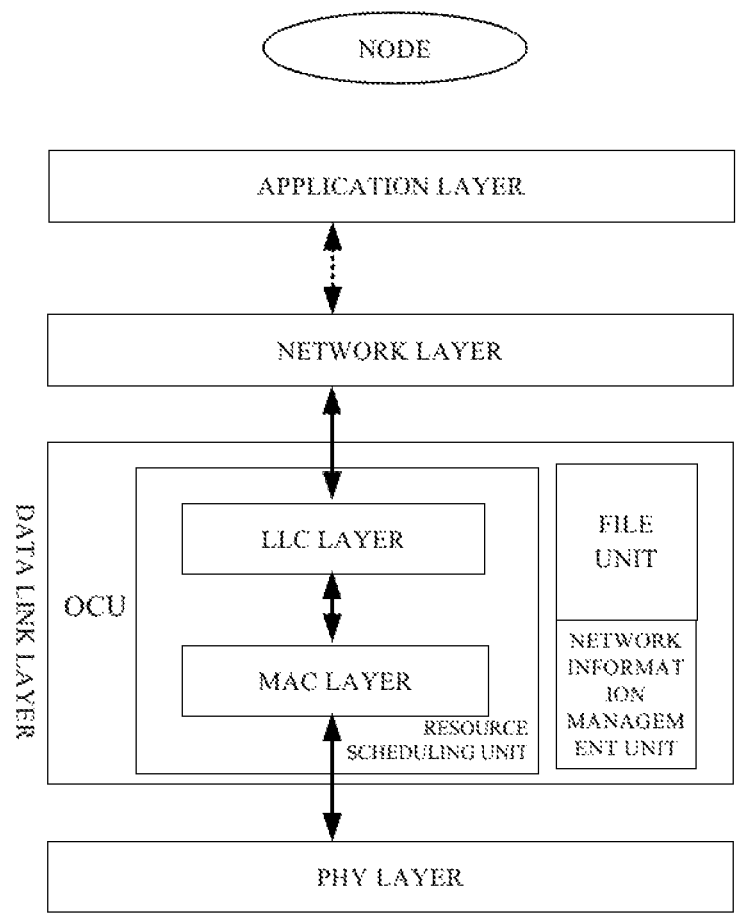
FIG. 2 illustrates the operation control unit according to the present invention implemented on each network node in the network architecture as shown in FIG. 1.

FIG. 2 specifically illustrates a specific implementing mode based on the operation control unit of each node in the distributed cloud storage system in FIG. 1.

According to an example of the present invention, the operation control unit of each node may be implemented in the data link layer, or may directly interact with the data link layer, or may provide services for the data link layer. The resource scheduling unit allocate proper hardware resources and network resources for the file unit and the network information management unit, so that the file unit protects and searches the files stored therein. The stored file information, for example, may include node information acquired by the node and information received from other neighbor nodes in the whole cloud storage system. The resource scheduling unit further allocates hardware and/or network resources for the network information management unit when implementing automotive push of the information between nodes and data update. For example, the information stored in the file unit is transmitted to the application layer through the data link layer when needed by the application layer, or the acquired node information is delivered to the physical (PHY) layer through a MAC layer according to a corresponding protocol.

Figure 3:
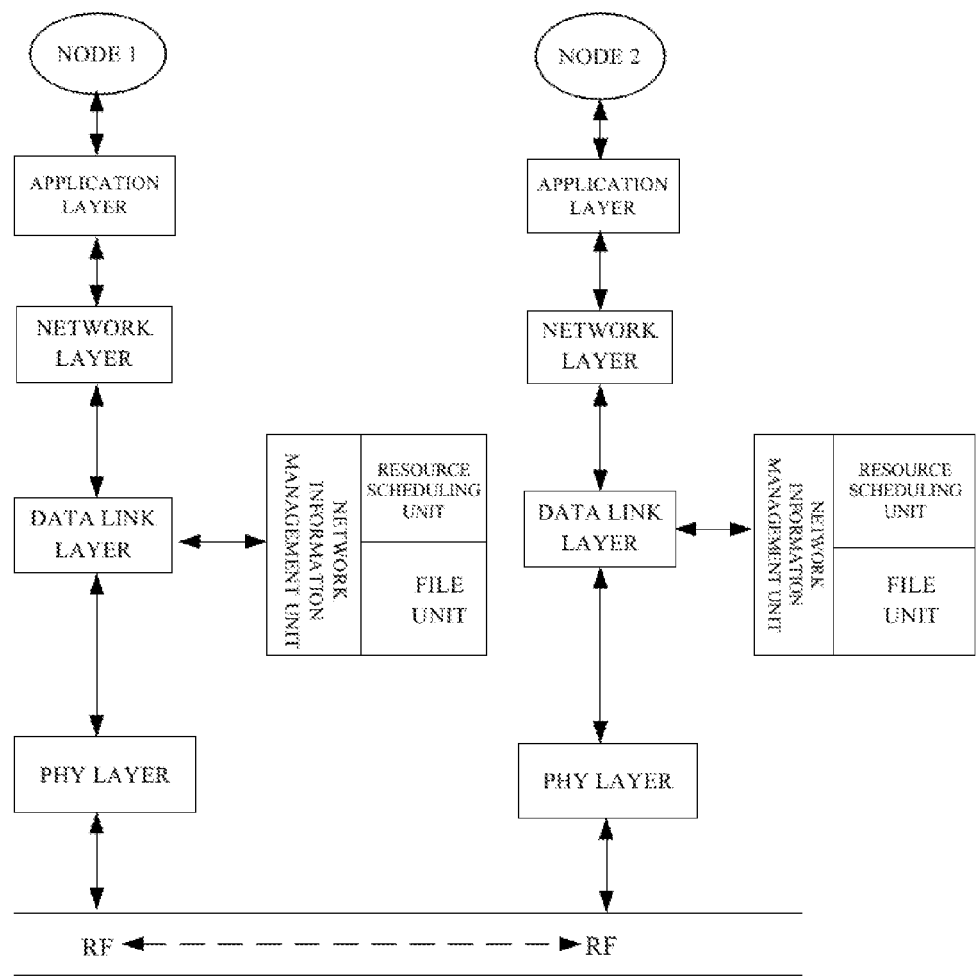
FIG. 3 illustrates a process of implementing information transmission using the operation control unit between the nodes as shown in FIG. 2.

FIG. 3 illustrates the mode of data transmission between the modes implemented based on the operation control unit of each mode in the distributed cloud storage system shown in FIG. 1.

As shown in FIG. 3, when the network information management unit in the operation control unit of node 1 issues a request for data push, the data pass through the data link layer and PHY layer and radio frequency transmission and then reach the PHY layer of node 2, and then continue to be transmitted to pass through the data link layer of node 2, finally reaching the network information management unit of node 2. A push flow is completed.

The cloud storage system implemented based on the node operation control unit according to the present invention can directly achieve data exchange between nodes, without the initiation of the application layer, through the network information management unit directly interacting with the data link layer. When the data acquired by the node are updated, the data may be stored in the file unit of the node through the network information management unit to be acquired by other nodes in the network. The network node stores node information through the file unit thereof, and directly transmits information between nodes by way of the data link layer, without the application layer, through the network information management unit thereof so as to achieve update of data between nodes. The network information management unit of each node can also sends a request for acquiring the node data stored in the file unit of neighbor nodes, thereby implementing the mode of cloud storage of data.

Figure 4:
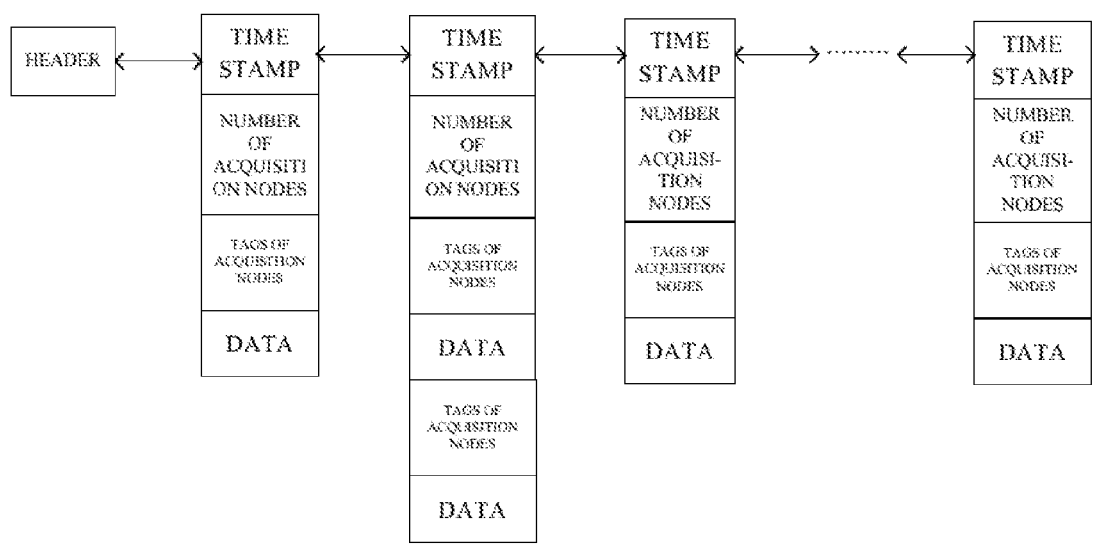
FIG. 4 illustrates the format of a block chain table.

FIG. 4 exemplarily shows the format of a block chain table. The block chain table includes a plurality of information abstracts, which contains time stamp, the number of acquisition nodes and tags of the acquisition nodes, as shown in the following table:

| Push path | Time stamp at the end of the block chain | Number of acquisition nodes at the end | Tags of acquisition nodes at the end | Time stamp of this Time | Tags of acquisition nodes | Data |
| --- | --- | --- | --- | --- | --- | --- |

This format is only illustration of the network layer. Please see the corresponding network protocol for other parts such as check. Since other parts of the data packet are not within the protection scope of the present invention, they are not listed herein.

As shown in FIG. 4, a block chain is a chain table structure for storing history data, and achieves the purpose of recording by recording time, the number of acquisition nodes, the tags of the acquisition nodes and data. Wherein, a block chain includes a plurality of the above information abstracts.

Different blocks have different sizes, because there may be several nodes acquiring data at a certain time point, and the number of the acquisition nodes is required to record the number of nodes with changed data at this moment.

Preferably, the information abstracts of the block chain table are sequenced in an order from old to new according to the time stamps.

According to a specific example, when the data of the network node are stored in the manner of block chain table, after the network node receives the information, the received information tag is compared with the node tag in the existing block chain table. If there are the same node tags, a new data block is used to replace the old one in an order according to the time stamps; if there is no same node tag, a new data block is entirely incorporated into the end of the block chain table.

Figure 5:
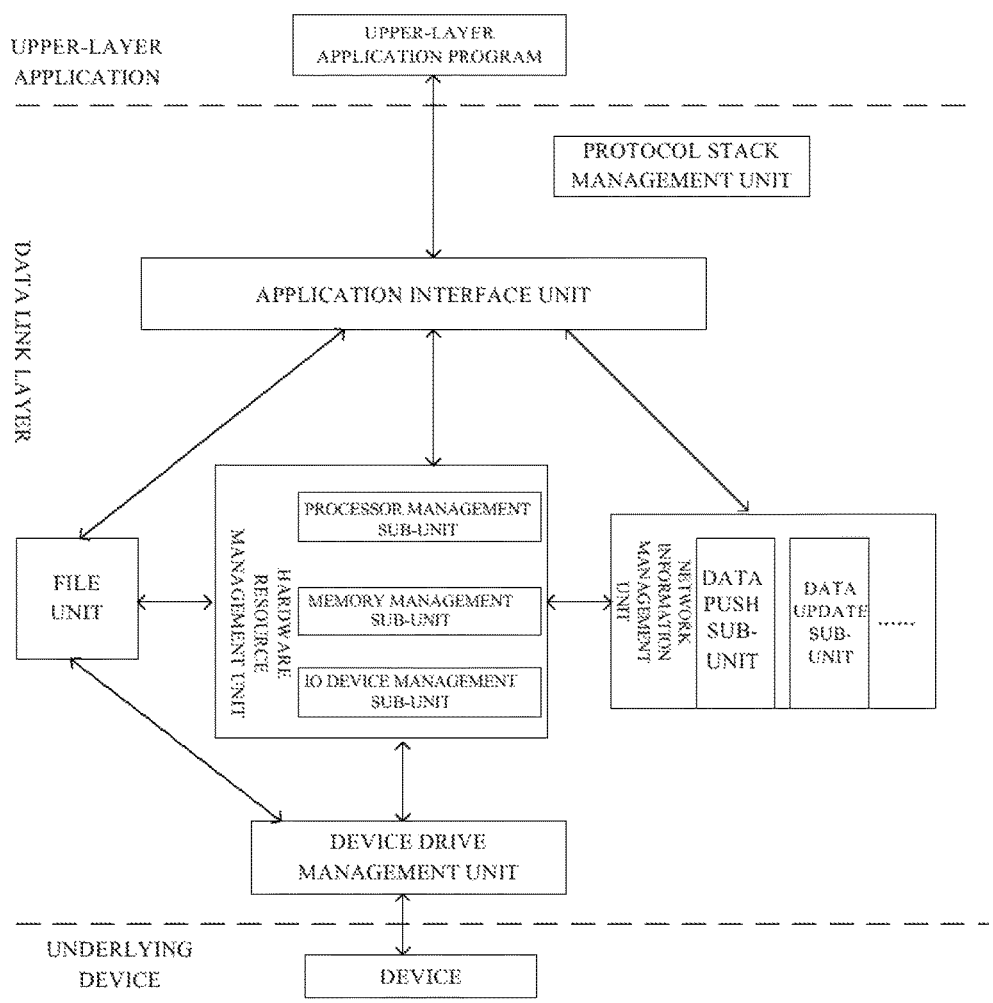
FIG. 5 illustrates a distributed network node operation system based on an operation control unit according to an example of the present invention.

FIG. 5 illustrates a specific example of the distributed network node operation system including an operation control unit implemented on each network node according to the present invention. As shown in FIG. 5, the distributed network node operation system based on an operation control unit according to the information of the present invention is located between an upper-layer application and an underlying device. The upper-layer application is located above the operation system, and it is a set of applications providing a certain particular service for the user.

The distributed network node operation system based on an operation control unit according to the present invention includes a network information management unit, an application interface unit, a file unit, a hardware resource management unit, a protocol stack management unit and device drive management unit.

The network information management unit is responsible for management of network information, and includes a data push sub-unit and a data update sub-unit. The data push sub-unit is responsible for automotive push of information between nodes, and the data update sub-unit is responsible for update of data between nodes.

The network information management unit is applicable for, when the data acquired by the acquisition node are changed, controlling the acquisition nodes to plan a push path according to the routing table, encapsulate the data acquired this time, the end information abstract in the block chain and the push path in a specified format, and actively push the encapsulated information to the first neighbor node where the network communication can reach, and write the data acquired this time into the end of the block chain of the acquisition node, and finally send the encapsulated information to the cloud.

In an example, the information abstract includes time stamp, the number of acquisition nodes and the tags of the acquisition nodes.

In the present invention, the first neighbor node refers to the node in the one-hop communication range of the acquisition node. The incorporation herein means that when the neighbor node receives two or more pieces of information with the same time stamp but sent by different acquisition node tags, the neighbor node combines this information into a format of time stamp, the number of acquisition nodes, the tags of the acquisition nodes, data, the tags of the acquisition nodes, data . . . . Wherein, the number of the colleting nodes is determined according to the number of the tags of the acquisition nodes, each tag of collecting node is followed immediately by its data, and the order of the tags of the acquisition nodes may be agreed in advance, for example in an ascending order, and the like.

After the first neighbor node receives the encapsulated information shared by the acquisition node, the network information management unit incorporates the time stamp of this time, the tags of the acquisition node and the data in the encapsulated information into the block chain in an order according to the time stamps; meanwhile it actively pushes the received encapsulated information to the second neighbor node. In such a way, the second neighbor node can actively push the encapsulated information to the third neighbor node. The number of times of active push may be determined according to the specific condition of the network.

The hardware management unit manages hardware resources, the application interface unit converts the services provided by the file unit, the hardware resource management unit and the network information management unit to a programmatic interface available to the upper-layer applications.

The protocol stack management unit encapsulates a set of library functions of the protocol stacks of different network protocols, and provides the system with different communication protocol modes and networking modes through the interface unit, so as to achieve cross-protocol distributed cloud storage. The application interface unit further provides an interface for interacting with the library functions of the protocol stacks; the device drive management unit manages the underlying device application drive, and invokes the corresponding protocol stack library functions in the protocol stack management unit through the application drive. The present invention application enables the protocol stack to encapsulate library functions, and the operation system provides a scheduling interface for the protocol stack. The operation system supports underlying devices of different communication modes and networking modes, and can invoke the application drives of these devices. The library functions of different protocol stacks are invoked for routing and application management of the network, making a plurality of communication modes and protocols compatible. This ensures universality of the network.

The protocol stack management unit refers to a set encapsulating the library functions of the protocol stacks of different network protocols. According to an example of the present invention, the protocol stack management unit may be located in the MAC layer.

The application interface unit is a set of application interfaces for encapsulating the services provided by the file unit, the task management unit and the information management unit into a programmatic interface available to the upper-layer applications and providing an interface for interacting with the library functions of the protocol stack.

The file unit is responsible for managing and storing file information, organizing and allocating the space of the file storage device, and storing files and protecting and searching the stored files.

The hardware resource management unit is responsible for managing the hardware resources, including processor management, memory management and IO (input and output devices) management. A processor management sub-unit is responsible for allocating and controlling processors. A memory management sub-unit is responsible for allocation and recycle of memory. An IO device management sub-unit is responsible for allocation and manipulation of IO devices.

The device drive management unit is responsible for managing the underlying application drives, and invoking different protocol stack library functions through different application drives, thus making a plurality of communication modes and protocols compatible.

Figure 6:
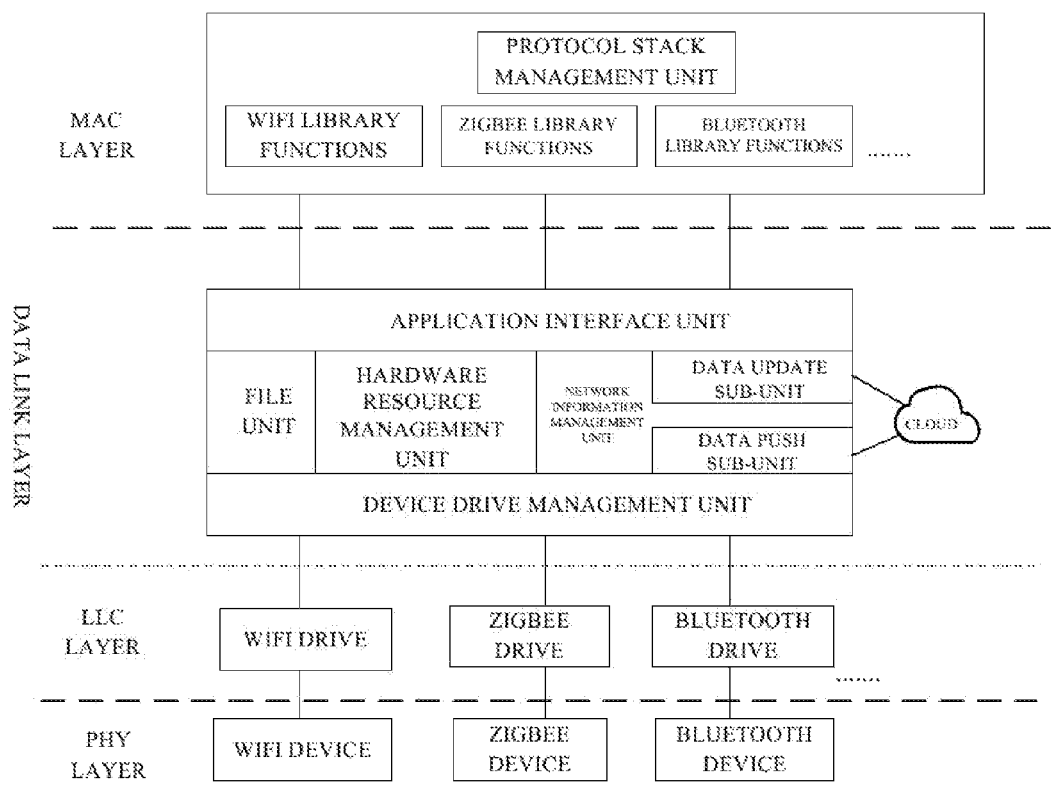
FIG. 6 illustrates distributed network node operation system based on an operation control unit according to a specific example of the present invention.

FIG. 6 illustrates a specific example of the distributed network node operation system based on an operation control unit implemented on each network node according to the present invention.

As shown in FIG. 6, the distributed network node operation system based on an operation control unit according to the present invention is implemented between a physical layer (PHY layer) and a data link layer. In particular, the data link layer may be divided into a logic link sub-layer (LLC layer) and a media access control sub-layer (MAC layer). According to an example of the present invention, the distributed network node operation system according to the present invention may be located between the logic link sub-layer (LLC layer) and the media access control sub-layer (MAC layer). According to another example of the present invention, the distributed network node operation system according to the present invention may also be incorporated with the logic link sub-layer (LLC layer) and the media access control sub-layer (MAC layer).

Since the distributed network node operation system according to the present invention works between the data link layer and the physical layer, the architecture of the network protocol is not changed macroscopically and is transparent to the upper-layer applications; plentiful user interfaces are provided for facilitating secondary development and improvement.

In the present example, the network information management unit is responsible for managing the data frames transmitted between the data link layer and the physical layer, and selectively storing the data frames according to the corresponding application requirements.

In this example, the network information management unit selectively data frames according to the corresponding application requirements, and the data frames are stored in the file unit. The file unit distinguishes different data versions by recording a particular tag. The so-called particular tag includes but not limited to time stamp, event drive.

In this example, the hardware resource management unit is also responsible for scheduling various tasks in the distributed network node operation system. The scheduling algorithm includes real-time preemption scheduling mode of event triggering. Due to direct interaction with the data link layer, the distributed network operation system of the present patent can achieve real-time preemption scheduling mode based on event triggering. When the data frames in the data link layer need to be transmitted to the physical layer, or the bit streams received by the physical layer need to be transmitted to the data link layer, tasks of corresponding priorities will be established in the network information management unit and uniformly scheduled by the task scheduling unit to ensure that respond can be made to the essential tasks immediately. As for the established tasks of different priorities, in addition to transmission of data, other processing may also be made to the data according to the actual application requirements so as to facilitate secondary development and application.

The device drive management unit is responsible for managing application drives of the underlying devices, selecting the corresponding application drives according to different underlying devices, and performing the corresponding initiation. By invoking different underlying drives, different underlying hardware devices are supported.

In this example, by means of device drive management and protocol stack management, a plurality of networking modes, including but not limited to star network, mesh network, loop network and other network topology structures, can be supported; a plurality of wireless communication protocols including but not limited to WiFi, ZigBee and Bluetooth can also be supported through the LLC layer and the MAC layer. Depending on the underlying devices of different communication modes and networking modes, the corresponding application drives of these devices may be invoked, and library functions of different protocol stacks may be invoked for routing and application management of the network, thereby making a plurality of communication modes and protocols compatible. Therefore, the operation system of the present application is compatible with a plurality of networks and a plurality of protocols, thus realizing intercommunication.

The cloud storage system of the present invention can realize active push of information between nodes, i.e., any node can read the data pushed and updated in each node of the network within the range reachable for the network communication. Each node actively pushes and updates data in a event-driven manner, and does not need to initiate multiple times of response communication processes based on "request for data-determine receipt of the request-send data-determine receipt of the data" manner (analogous to TCP manner) or "request for data-send data" manner (analogous to UDP manner). Event driven means that when the value of a certain event is changed, a network information management function is invoked to perform processing, and the definition of the certain event is maintained by the network information management function.

If the acquisition nodes and the first neighbor node achieve whole-network coverage, then whole-network push of data is achieved. Wherein, the first neighbor node refers to the node within the one-hop communication range of the acquisition node. If acquisition nodes and the first neighbor node do not achieve whole-network coverage, then further data of push may be further implemented. The second neighbor node may be also allowed to incorporate the time stamp of this time, the tag of the acquisition node and the data in the encapsulated information into the block chain after receiving the encapsulated information; meanwhile, the received encapsulated information is actively pushed to the third neighbor node according to the push path. In such a way, the process is over until all nodes in the push path are completed.

Incorporation means that when the neighbor node receives two or more pieces of information with the same time stamp but sent by different acquisition node tags, the neighbor node combines this information into a format of time stamp, the number of acquisition nodes, the tags of the acquisition nodes, data, the tags of the acquisition nodes, data . . . . Wherein, the number of the colleting nodes is determined according to the number of the tags of the acquisition nodes, each tag of acquisition node is followed immediately by its data, and the order of the tags of the acquisition nodes may be agreed in advance, for example in an ascending order.

The above data cloud storage and management method implemented though a network node configuration operation control unit and active information push method is especially suitable for short-life information storage and management in the Internet of Things. Since short-life information has characteristics of high real-time demand and short information timeliness, storage should be updated in the case of storing such kind of data, only new valuable data are retained, and history data should be deleted in time, so as to save space. Preferably, the above cloud storage method adopts a uniform form of data block chain tables, thus achieving updated storage of information.

Specifically, after communication node is networked, it firstly performs data transmission with other nodes. The received encapsulated data are incorporated into a data block chain table through resource management in the operation system layer and then are stored in a special file unit. The data block chain table includes time stamp, the tag of the acquisition node, and data, etc., wherein, the time stamp is a time tag of the transmitted data and is written in by a transmitted source node as a basis for distinguishing the version of the data. The tag of the acquisition node represents the source of the data. After receiving the information, a target node compares the tag of the acquisition node with the node tag in the existing data block chain table, and if there are same node tags, it replaces an old data block with a mew data block according to the order of time stamps; if there are not same node tags, entirely incorporates a new data block into the end of the block chain table. As for the same source node tag, only the data with the latest time stamp is retained, history data are deleted in a set time, thus achieving updated storage.

A plurality of information abstracts in an entire data block chain table are arranged in an order from old to new according to the time stamps, and they are actually stored in the memory of each node in a distributed manner. Link scheduling may be performed between different nodes through the operation system layer to acquire data from each other, and the whole process realizes an updated distributed cloud storage. Moreover, this new cloud storage method does not need centralized device management, and data management of each node is controlled by its own operation system in the communication protocol layer, thereby realizing the real sense of cloud storage of distributed management.

Any node can read the data pushed and updated by each node in the network through this software within the definition range reachable for the network communication, and the definition of these data that can be read may be maintained by the network information management function.

The distributed cloud storage and data management method implemented through active data push according to the present invention has the following functional advantages over the prior art:

1) distributed management: each user performs data management through his the operation system in his own communication protocol layer, without the need of centralized device management by the application software of the service provider'

2) save storage overhead: life cycle of the information is taken into consideration for storage, the conventional concept of complete data storage is changed, an updated storage mode is used, value information is retained, history data are deleted, thus saving storage resources.

3) protect user privacy: data are always dispersedly stored in the communication protocol layer of each node in a link chain form and are stored in an updated way, and any node cannot store history data, thus avoiding the problem of some operator retaining user data for consumption behavior analysis or even selling user data and protecting users' data privacy from violation.

Though the exemplary examples of the present invention application have been described and depicted, a person skilled in the art shall appreciate that various modifications and replacements made by made to the present application without departing from the spirit of the present patent. Moreover, many changes may be made to adapt particular cases to the teaching of the present invention without departing from the core concept of the present invention application. Therefore, the present invention application is not limited to the specific examples disclosed herein, and the present invention application may further include all examples and other equivalents within the scope of the present invention application.

What is claimed is:

1. A cross-protocol distributed cloud storage system based on a network node operation control unit, comprising a plurality of network nodes, each of the network node comprises an operation control unit that directly interacts with a data link layer, the operation control unit comprising a file unit, a network information management unit and a resource scheduling unit, wherein,
   the file unit is used to manage and store file information of the network node where the file unit is located;
   the network information management unit is used to interact with the data link layer so as to perform link scheduling for delivering the file information between the network nodes, and to update data between the nodes;
   the resource scheduling unit is used to allocate and schedule hardware or network resources for the network information management unit and the file unit for implementing functions thereof; and
   data of the network nodes are stored in a manner of a block chain table in the memory of each node in a distributed manner, and link scheduling may be performed between different nodes through an operation system layer to acquire data from each other.

2. The distributed cloud storage system according to claim 1, wherein the network information management unit comprises a data push sub-unit which is responsible for automotive push of information between the nodes and a data update sub-unit which is responsible for update of the data between the nodes.

3. The distributed cloud storage system according to claim 1, wherein the file unit is further used to organize and allocate file storage space, and is responsible for file storage and protecting and searching stored files.

4. The distributed cloud storage system according to claim 1, further comprising a protocol stack management unit for encapsulating a set of library functions of protocol stacks of different network protocols and providing different communication protocol manners and networking manners for the system through an interface unit to implement cross-protocol distributed cloud storage.

5. The distributed cloud storage system according to claim 1, wherein the block chain table comprises a plurality of information abstracts, including time stamps, a number of acquisition nodes and tags of the acquisition nodes.

6. The distributed cloud storage system according to claim 1, wherein the information abstracts of the block chain table are arranged in an order from old to new according to the time stamps.

7. A distributed cloud storage method implemented by using the cloud storage system according to claim 1, comprising the steps of: network nodes storing node information through a file unit thereof, and a network information management unit directly interacting with a data link layer so as to deliver the information between the nodes, and implementing update of data between the nodes.

8. The distributed cloud storage method according to claim 7, wherein upon receiving the information, the network node compares a tag of the received information with a node tag in the existing block chain table, and if there are same node tags, replaces an old data block with a new data block according to the order of time stamps; if there are not same node tags, entirely incorporates a new data block into the end of the block chain table.

* * * * *